(12) United States Patent
Quintin (10) Patent No.: US 11,591,963 B1
(45) Date of Patent: Feb. 28, 2023

(54) SYSTEMS AND METHODS FOR INTERNAL SPLINE LUBRICATION (71) Applicant: PRATT & WHITNEY CANADA CORP., Longueuil (CA)

(72) Inventor: Hugo Quintin, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 21 days.

(21) Appl. No.: 17/404,273

(22) Filed: Aug. 17, 2021

(51) Int. Cl.
*F02C 7/06* (2006.01)
*F01D 25/20* (2006.01)

(52) U.S. Cl.
CPC ............... *F02C 7/06* (2013.01); *F01D 25/20* (2013.01); *F05D 2220/323* (2013.01); *F05D 2260/98* (2013.01)

(58) Field of Classification Search
CPC .. F02C 7/06; F05D 2220/323; F05D 2260/98; F01D 25/20
USPC ............................................................. 415/1
See application file for complete search history.

(56) References Cited

U.S. PATENT DOCUMENTS

| 4,493,623 | A | 1/1985 | Nelson |
| 4,932,501 | A | 6/1990 | Decker |
| 5,119,905 | A | 6/1992 | Murray |
| 9,732,630 | B2 | 8/2017 | Lucas |
| 9,932,860 | B2 | 4/2018 | Stutz et al. |
| 10,113,429 | B2 | 10/2018 | McDonagh |
| 2016/0032769 | A1* | 2/2016 | Stutz ....................... F16N 7/363 464/7 |
| 2016/0069186 | A1* | 3/2016 | McDonagh ............. F01D 5/085 416/95 |

* cited by examiner

*Primary Examiner* — Yi-Kai Wang
(74) *Attorney, Agent, or Firm* — Norton Rose Fulbright Canada LLP (57) ABSTRACT

An aircraft engine, has: a shaft rotatable about a central axis and engaged at an end thereof to a rotatable load via splines; a reference tube extending around the shaft and having a first end secured to the shaft and a second end free relative to the shaft for measuring a deformation of the shaft, the reference tube defining at least one tube aperture; an oil nozzle defining an exit flow axis intersecting the at least one tube aperture, the shaft defining at least one shaft aperture through the shaft, an oil flow path extending from the oil nozzle to the splines; and a drain outlet located radially outwardly of an inlet of the at least one shaft aperture for outputting excess oil out of an annular gap defined between the shaft and the reference tube.

20 Claims, 5 Drawing Sheets

SYSTEMS AND METHODS FOR INTERNAL SPLINE LUBRICATION

TECHNICAL FIELD

The application relates generally to gas turbine engines and, more particularly, to lubrication systems used in such engines.

BACKGROUND OF THE ART

A gas turbine engine has a lubrication system for circulating lubricant (e.g. oil) through a plurality of components, such as bearings, spline couplings, and so on. In some cases, nozzles are used to jet the lubricant toward the components.

SUMMARY

In one aspect, there is provided an aircraft engine, comprising: a shaft rotatable about a central axis and engaged at an end thereof to a rotatable load via splines; a reference tube circumferentially extending around the shaft, the reference tube having a first end secured to the shaft for rotation with the shaft and a second end free relative to the shaft for measuring a deformation of the shaft, the reference tube defining at least one tube aperture through the reference tube; an oil nozzle fluidly connected to a source of oil, the oil nozzle defining an exit flow axis intersecting the at least one tube aperture for injecting oil through the reference tube, the shaft defining at least one shaft aperture extending through the shaft, an oil flow path extending from the oil nozzle to the splines via the at least one tube aperture and via the at least one shaft aperture for lubricating the splines; and a drain outlet located radially outwardly of an inlet of the at least one shaft aperture for outputting excess oil out of an annular gap defined between the shaft and the reference tube.

The aircraft engine described above may include any of the following features, in any combinations.

In some embodiments, the drain outlet is located downstream of the at least one tube aperture relative to an oil flow from the oil nozzle.

In some embodiments, the shaft defines a pool circumferentially extending around the central axis for receiving oil from the oil nozzle, the at least one shaft aperture in fluid flow communication with the pool, the drain outlet axially aligned with the pool and located radially outwardly of the pool.

In some embodiments, the shaft has a main section and an end section, the end section defining the splines, a diameter of the main section less than that of the end section, the pool located proximate an intersection between the main section and the end section.

In some embodiments, the drain outlet is defined through the reference tube.

In some embodiments, the drain outlet extends in a direction having a radial component relative to the central axis.

In some embodiments, the aircraft engine includes a sensor for measuring a rotation of the shaft in relationship to the reference tube, the drain outlet being axially offset from the sensor.

In some embodiments, the drain outlet is an annular space defined radially between an end of the reference tube and the shaft.

In some embodiments, a bearing is in abutment against with the end of the reference tube, the bearing having an inner race secured for rotation with the shaft, the inner race defining oil passages in fluid communication with the annular space.

In some embodiments, a bearing is rollingly engaged to the reference tube and a bearing housing circumferentially extending around the central axis and defining a bearing cavity containing the bearing, the drain outlet communicating with the bearing cavity.

In another aspect, there is provided a method of lubricating a splines of a shaft of an aircraft engine, the shaft surrounded by a reference tube having a first end secured to the shaft and a second end free relative to the shaft, the method comprising: injecting oil through at least one tube aperture defined through the reference tube; directing the injected oil toward the splines via at least one shaft aperture defined through the shaft; lubricating the splines with the injected oil; and flowing excess oil out of an annular gap between the shaft and the reference tube via a drain outlet located radially outwardly of an inlet of the at least one shaft aperture.

The method described above may include any of the following features, in any combinations.

In some embodiments, the flowing of the excess oil via the drain outlet includes flowing the excess via the drain outlet located downstream of the at least one tube aperture relative to a flow of the injected oil.

In some embodiments, the directing of the injected oil toward the splines includes flowing the oil in a pool circumferentially extending around a central axis and flowing the oil from the pool through the at least one shaft aperture, the drain outlet being axially aligned with the pool and located radially outwardly of the pool.

In some embodiments, the flowing of the excess oil includes flowing the excess oil through the drain outlet defined through the reference tube.

In some embodiments, the flowing of the excess oil through the drain outlet includes flowing the excess oil through the reference tube in a direction having a radial component relative to the central axis.

In some embodiments, the flowing of the excess oil includes flowing the excess oil through the drain outlet communicating with a bearing cavity.

In some embodiments, flowing of the excess oil includes flowing the excess oil through the drain outlet being an annular space defined radially between an end of the reference tube and the shaft.

In some embodiments, the method includes flowing the excess oil out of the annular gap and in oil passages defined by an inner race of a bearing in abutment against an end of the reference tube.

In some embodiments, the flowing of the excess oil through the drain outlet includes flowing the excess oil in a bearing cavity defined by a bearing housing.

In some embodiments, the method includes flowing the excess oil via a secondary drain outlet located axially aft of the at least one tube aperture.

DESCRIPTION OF THE DRAWINGS

Reference is now made to the accompanying figures in which.

DETAILED DESCRIPTION

Figure 1:
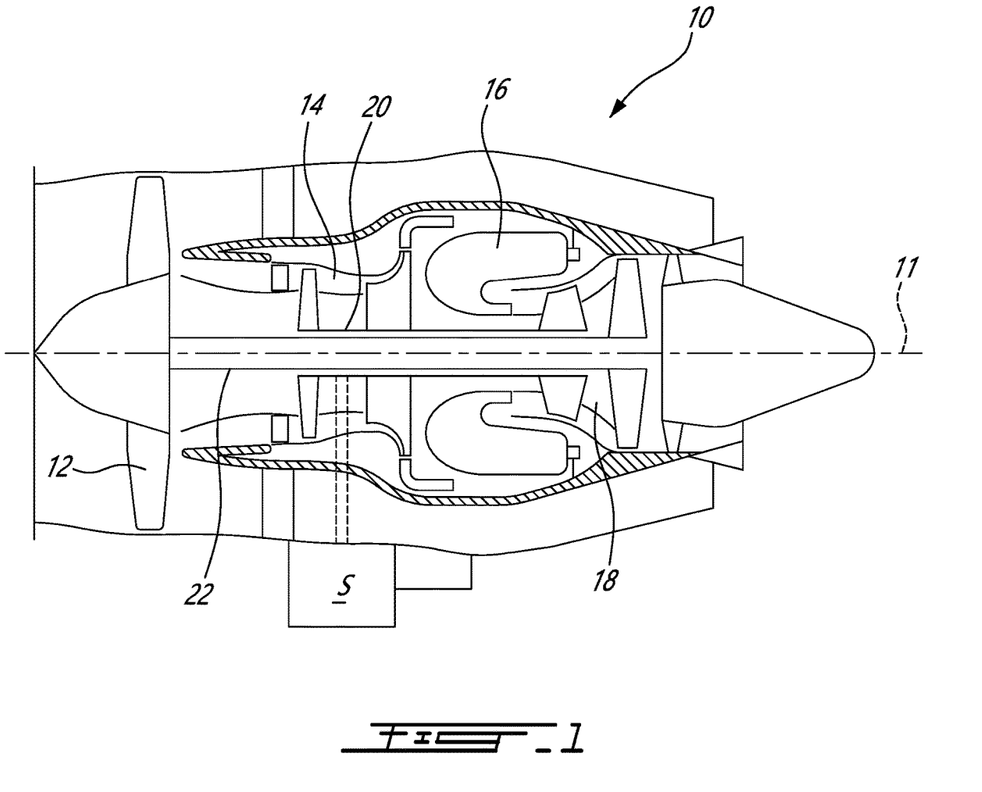
FIG. 1 is a schematic cross-sectional view of a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. The gas turbine engine 10 may include a low-pressure shaft 22 and a high pressure shaft 20. In the embodiment shown, the low- and high-pressure shafts 22, 20 are concentric and rotatable one relative to the other about the central axis 11. The engine 10 may include a lubrication system S for circulating a lubricant, such as oil, toward and from components in need of lubrication. These components may include, for instance, bearings, spline, and so on.

Figure 2:
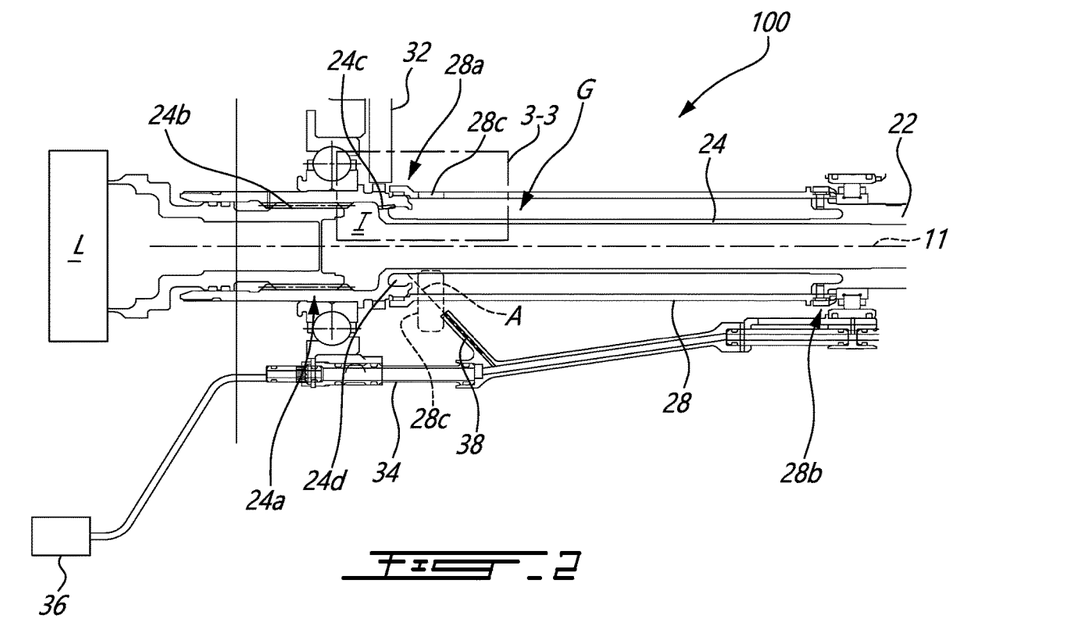
FIG. 2 is a schematic cross-sectional view of a portion of the gas turbine engine of FIG. 1 illustrating a reference tube and a torque shaft.

Referring now to FIGS. 1-2, the low-pressure shaft 22 may be in driving engagement with a rotatable load L, which may be the fan 12 as illustrated in FIG. 1, via a torque shaft 24. The torque shaft 24 may be a portion of the low-pressure shaft 22. In other words, the torque shaft 24 and the low-pressure shaft 22 may be monolithic. The low-pressure shaft 22 and the torque shaft 24 may alternatively be two distinct components secured to one another. The torque shaft 24 may have an end 24a defining splines 24b. In the embodiment shown, the splines 24b are defined on an inner side of the torque shaft 24, which is hollow in the embodiment shown. The splines 24b are matingly engaged with correspondingly mating splines on the Low-pressure shaft 22 to allow a rotational input to the transmitted from the low-pressure shaft 22 to the rotatable load L. It will be appreciated that, although the rotatable load L is depicted as corresponding to the fan 12, the rotatable load may be, alternatively, a propeller, a helicopter rotor, an input of a reduction gearbox, an accessory, and so on.

In some cases, it may be required to lubricate the splines 24b for proper operation. This may be done by injecting oil toward the splines 24b from within an opposite end of the low-pressure shaft 22. However, in some cases, a length of the low-pressure shaft 22 is such that oil injected from the opposite end of the low-pressure shaft 22 may not reach the splines 24b. It is therefore contemplated herein to inject the oil toward the splines 24b from outside of the low-pressure shaft 22.

However, in the embodiment shown, the torque shaft 24 is part of an assembly 100 including a reference tube 28; the reference tube 28 circumferentially extending around the torque shaft 24. The reference tube 28 has a fore end 28a proximate to the splines 24b and an aft end 28b at an intersection between the torque shaft 24 and the low-pressure shaft 22. The aft end 28b of the reference tube 28 is secured to the torque shaft 24. Herein, fasteners are used to secure the aft end 28b of the reference tube 28 to the torque shaft 24. Other fastening means are contemplated. The fore end 28a of the reference tube 28 is rotatable relative to the torque shaft 24 such that the fore end 28a is rotationally free relative to the torque shaft 24. Hence, the reference tube 28 may not transfer torque from the low-pressure shaft 22 to the rotatable load L.

The combination of the torque shaft 24 and of the reference tube 28 may be used to measure the torque applied by the engine 10 on the rotatable load L. Dimensions of the torque shaft 24 are known and, in function of those dimensions, it may be possible to determine the torque transmitted by the low-pressure shaft 22 to the rotatable load L. This may be achieved by measuring a deformation of the torque shaft 24 as a result of the driving of the rotatable load L. This deformation is in a circumferential direction relative to the central axis 11. More specifically, a first reference point on the torque shaft 24 and axially aligned with the aft end 28b of the reference tube 28 may be circumferentially aligned with a second reference point on the torque shaft 24 and axially aligned with the fore end 28a of the reference tube 28 when the rotatable load L is at rest (non-rotating). Upon driving the rotatable load L, the first and second reference points may become circumferentially offset from one another. A magnitude of this offset increases with an increase of the torque transmitted by the low-pressure shaft 22 to the rotatable load L. A sensor 32, which may be a capacitance probe, may be used to measure the magnitude of this offset. This may be done using phonic wheels having teeth circumferentially distributed on both shafts; the sensor 32 being able to detect the passage of the teeth to measure the relative deformation of the torque shaft 24 in relationship to the reference tube 28. The sensor 32 may be operatively coupled to a controller that has instructions stored thereon to translate a value of the magnitude of the offset in a torque value. The reference tube 28 may be used herein to report the position of the second reference point at a location closer to the sensor 32. Indeed, since the fore end 28a of the reference tube 28 is free relative to the torque shaft 24 (i.e., it is not secured to the torque shaft 24; it is free; it is cantilevered; it is unconnected rigidly), the reference tube 28 may not be deformed following the transmission of a rotational input form the low-pressure shaft 22 to the rotatable load L via the torque shaft 24, as it is not used for load transmission—it is only rigidly connected to the shaft 24 or 22 at one end, away from the sensor 32.

Figure 3:
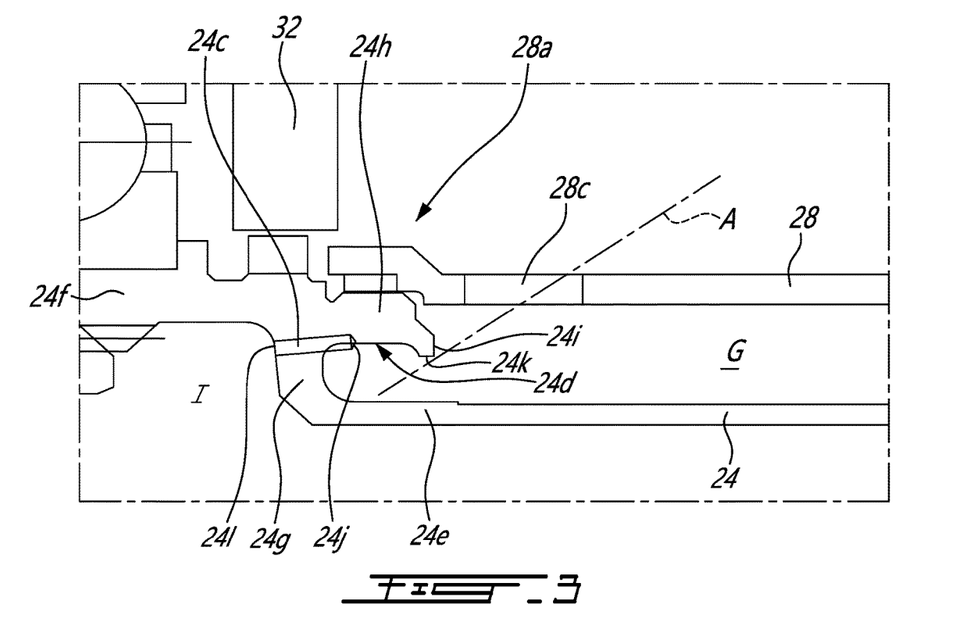
FIG. 3 is an enlarged view of a portion of FIG. 2.

Referring to FIGS. 2-3, the lubrication system may include a conduit including a line 34 fluidly connected to a source of lubricant 36, such as an oil tank. A nozzle 38 is hydraulically connected to the line 34 and is configured to inject oil for lubricating the splines 24b. However, the nozzle 38 and the spline 24b are on respective opposite sides of the torque shaft 24.

To allow the oil to reach the splines 24b, one or more apertures 28c, referred to below as tube aperture 28c, is defined through the reference tube 28 to allow the oil to circulate within an annular gap G located radially between the torque shaft 24 and the reference tube 28 relative to the central axis 11. One or more apertures 24c, referred to below as shaft aperture, is defined through a wall of the torque shaft 24 to allow oil to circulate from the gap G to an interior I of the torque shaft 24 to reach the splines 24b. Both of the apertures 28c, 24c defined through the reference tube 28 and the torque shaft 24 may be located proximate to the fore end 28a of the reference tube 28 and in close proximity to the spline 24b. The aperture(s) 24c may extend generally or substantially axially. In an embodiment, the aperture(s) 24c is(are) an axial aperture(s).

Referring more particularly to FIG. 3, the torque shaft 24 may define a pool, or oil dam, 24d for receiving and accumulating oil jetted by the nozzle 38. In the depicted embodiment, the pool 24d is annular and extends circumferentially all around the central axis 11. The pool 24d is defined on an outer side of the torque shaft 24. More specifically, and in the embodiment shown, the torque shaft 24 has main section 24e and an end section 24f. The splines 24b is defined by the end section 24f of the shaft 24. A diameter of the main section 24e is less than a diameter of the end section 24f. The pool 24d is located proximate to the intersection between the main and end sections 24e, 24f of the torque shaft 24, though it may be elsewhere. In the embodiment shown, the change in diameter is abrupt such that the main and end sections 24e, 24f of the torque shaft 24 are connected by an annular wall section 24g of the torque shaft 24, or like step; the annular wall section 24g may extend substantially radially relative to the central axis 11 from the main section 24e to the end section 24g, or may have a radial component to its direction.

The torque shaft 24 may define an axial protrusion 24h that extends substantially axially along the central axis 11 and away from the splines 24b and from the annular wall section 24g. A lip 24i extends from an end of the axial protrusion 24h. The lip 24i extends radially inwardly toward the central axis 11. The pool 24d is defined by a cooperation of the annular wall section 24g, the axial protrusion 24h, and the lip 24i. The wall section 24g, the axial protrusions 24h, and the lip 24i may be annular and may extend circumferentially all around the central axis 11. These components may be monolithic parts of the shaft 24, or add-on components.

In the embodiment shown, the shaft aperture 24c defined through the torque shaft 24 extends generally axially through the annular wall section 24g of the torque shaft 24. The shaft aperture 24c has an inlet end 24j; a tip 24k of the lip 24i being located radially inwardly of the inlet end 24j of the shaft aperture 24c relative to the central axis 11. That is, the tip 24k of the lip 24i may be closer to the central axis 11 than the inlet end 24j of the shaft aperture 24c. This may allow oil to accumulate in the pool 24d by centrifugal effect. The shaft aperture 24c has an outlet end 24l that may be radially aligned with the inlet end 24j. In the embodiment shown, the outlet end 24l of the shaft aperture 24c is located radially inwardly of the inlet end 24j such that the shaft aperture 24c slopes toward the central axis 11 from the inlet end 24j to the outlet end 24l. The slope may assist in directing the oil from the pool 24d to the spline 24b, again by the centrifugal effect. In a particular embodiment, the sloping may allow to recuperate a greater amount of oil before the shaft aperture 24c becomes blocked by a rotation of the torque shaft 24 compared to a configuration in which the shaft aperture 24c is parallel to the central axis 11. The sloping may allow to scoop more oil compared to a configuration in which the shaft aperture 24c is parallel to the central axis 11.

An exit flow axis A of the nozzle 38 may intersect the torque shaft 24 at a location that may be axially aligned with the pool 24d relative to the central axis 11. In other words, the nozzle 38 may be angled relative to the central axis to inject oil in proximity of the pool 24d. To reach the splines 24b, the oil injected by the nozzle 38 along the exit flow axis A, passes through the reference tube 28 via the tube aperture 28c defined therethrough, reaches the pool 24d where it may accumulate, and flows toward the spline 24b through the shaft aperture 24c. In other words, a flow path extends from the nozzle 38, to the tube aperture 28c through the reference tube 28, to the gap G between the torque shaft 24 and the reference tube 28, to the pool 24d, to the shaft aperture 24c defined through the torque shaft 24 and to the splines 24b.

The tube aperture 28c defined through the reference tube 28 may have an aperture axis that may have solely a radial component such that the aperture axis is normal to the reference tube 28. Alternatively, the aperture axis may further have a circumferential component and/or an axial component relative to the central axis 11. This may allow the tube aperture 28c to have a scooping effect. In other words, the tube aperture 28c may be machined normal to central axis 11 or at the same angle of incoming oil jet to create a scoop effect. More than one nozzle 38 may be used. The aperture axis may be parallel to the exit flow axis A of the nozzle 38. The shaft aperture 24c may extend solely axially or may extend along a direction having a radial and/or a circumferential component relative to the central axis 11 to assist in scooping the oil from the pool 24d.

In some cases, oil injected in the gap G by the nozzle 38 and through the tube aperture 28c may leak out of the gap G via a space between the fore end 28a of the reference tube 28 and the torque shaft 24. The oil that leaks in this manner may reach the sensor 32. This may impede proper operation of the sensor 32 and affect its readings. More specifically, a portion of the oil jetted by the nozzle 38 may not reach its target for various reason (e.g., oil brooming, targeting tolerances, and rotation speed of the shafts) and be "trapped" between the two shafts. The oil trapped may prevent incoming oil to reach its target efficiently by interference and churning. A portion of the oil can also reached undesired locations such as the sensor 32. In some cases, the oil may become trapped and may affect dynamics of the torque shaft 24. In some cases, the oil may flow against hot surfaces, which may create coaking.

Figure 4:
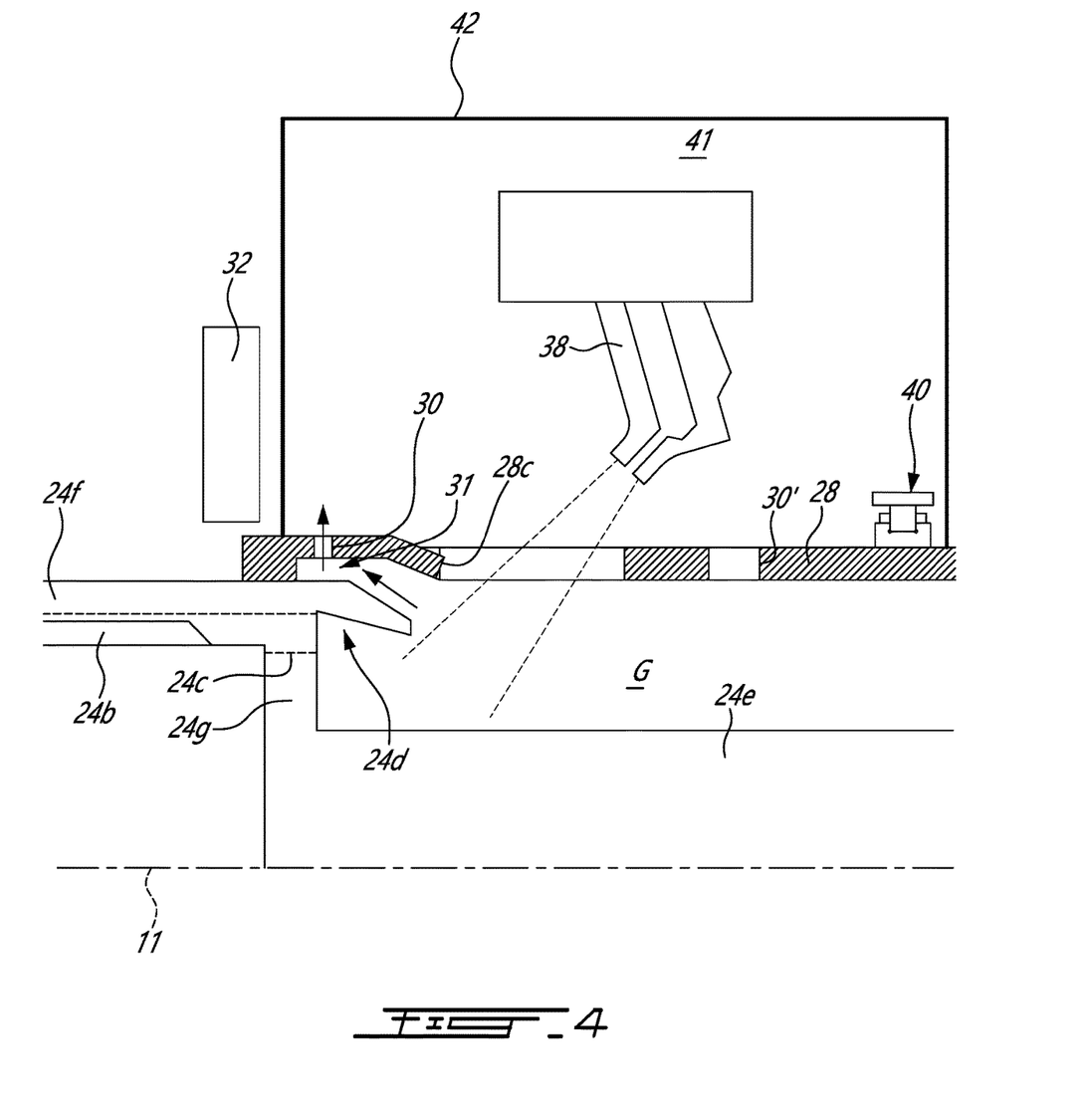
FIG. 4 is a schematic cross-sectional view of a portion of the gas turbine engine of FIG. 1 in accordance with one embodiment.

Referring now to FIG. 4, in the embodiment shown, the reference tube 28 is rollingly supported by a bearing 40 located within a bearing cavity 41 defined by a bearing housing 42. The nozzle 38 is located within the bearing cavity 41 such that oil that does not reach the tube aperture 28c may flow in the bearing cavity 41 to be subsequently scavenged and re-used.

In the illustrated embodiment, a drain outlet 30 is provided to allow excess oil to exit the annular gap G between the reference tube 28 and the torque shaft 24 and flow in the bearing cavity 41 to be recycled. As shown, the oil may reach an annular cavity 31 defined radially between the reference tube 28 and the torque shaft 24 and axially overlapping the pool 24d. The annular cavity 31 may be part of the annular gap G. The drain outlet 30 communicates with the annular cavity 31 and allows the oil to exit the annular cavity 31. In the present case, the drain outlet 30 is defined through the reference tube 28 proximate its fore end 28a. The drain outlet 30 is located radially outwardly of the inlet end 24j of the shaft aperture 24c. The aperture 30 is located downstream of the tube aperture 28c relative to an oil flow flowing from the oil nozzle 38. The drain outlet 30 is axially offset from the sensor 32 such that the excess oil exiting the gap G between the reference tube 28 and the torque shaft 30 may be free of interaction with the sensor 32. The sensor 32 is outside of the bearing cavity 41 and the drain outlet 30 is in fluid flow communication with the bearing cavity 41.

Hence, in use, the oil that accumulates in the annular cavity 31 may flow naturally out therefrom via the drain outlet 30 rather than flow out of the annular cavity 31 via an intersection between the reference tube 28 and the torque shaft 24. The oil may flow along a path of least resistance. Thus, it may be easier for the oil to leak out of the annular cavity 31 via the dedicated drain outlet 30 than to leak through the intersection between the reference tube 28 and the torque shaft 24. Oil may therefore remain in the bearing cavity 41 for subsequent recycling rather than flow out where it may cause issues thanks to the drain outlet 30.

As shown in FIG. 4, the annular cavity 31 is defined between a portion of the reference tube 28 that has a greater diameter than a remainder of the reference tube 28. The drain outlet 30 may be defined through this portion of the reference tube 28 having the greater diameter. In the present embodiment, the drain outlet 30 is axially aligned with the pool 24d and is located radially outwardly of the pool 24d relative to the central axis 11. The drain outlet 30 extends in a direction having a radial component relative to the central axis 11. The drain outlet 30 may extend solely radially relative to the central axis 11.

In some embodiments, a secondary drain outlet 30' is provided on an opposite sides of the tube aperture 28c such that the drain and secondary drain outlets 30, 30' are axially respectively fore and aft of the tube aperture 28c. In other words, the secondary drain outlets 30' may be located upstream of the tube aperture 28c relative to the oil flow flowing towards the splines 24b of the torque shaft 24. As shown in FIG. 4, an inlet of the drain outlet 30 is located radially outwardly of an inlet of the secondary drain outlet 30'.

Figure 5:
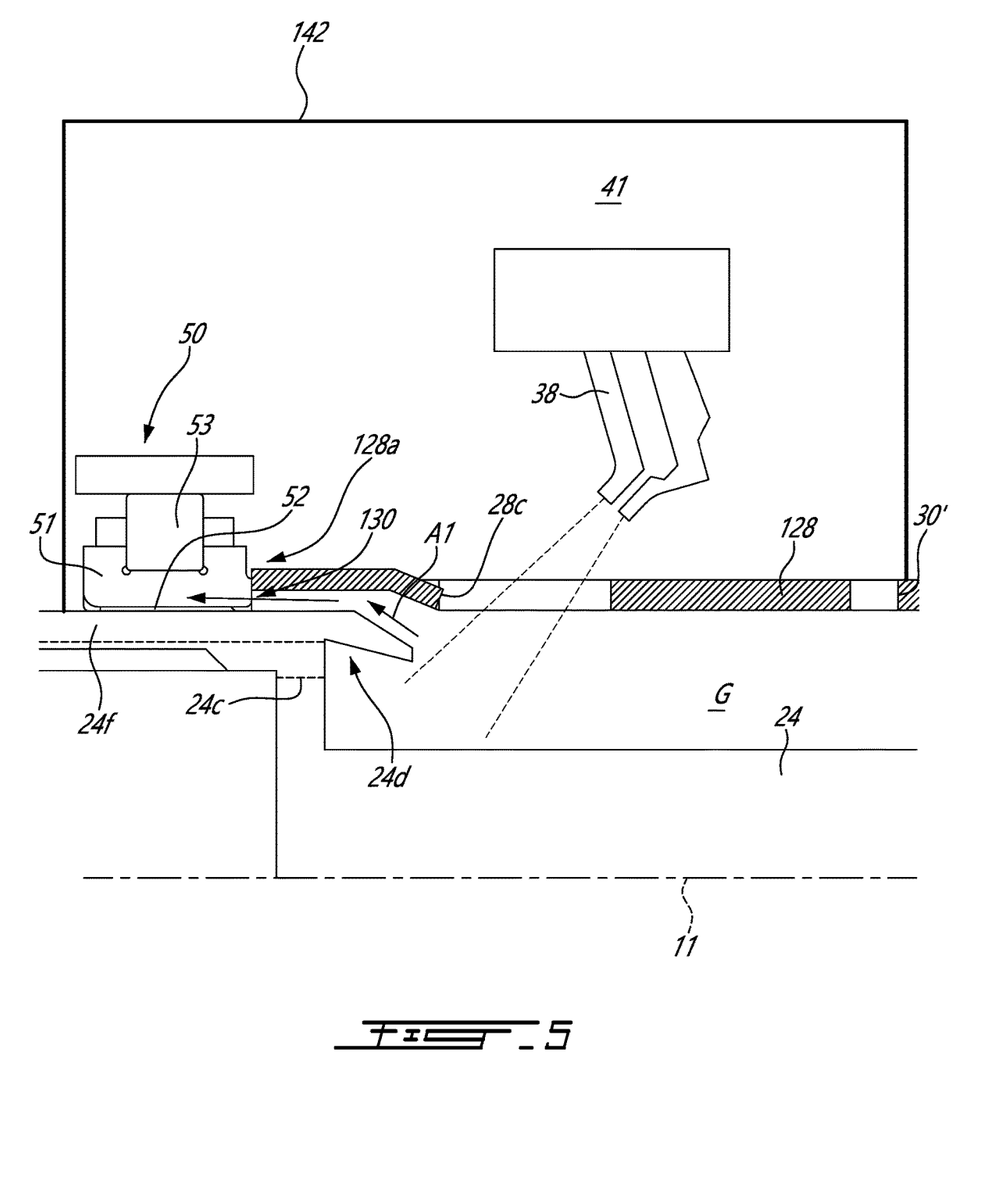
FIG. 5 is a schematic cross-sectional view of a portion of the gas turbine engine of FIG. 1 in accordance with another embodiment.

Referring now to FIG. 5, in the present embodiment, the drain outlet 130 is defined as an annular spacing between the fore end 128a of the reference tube 128 and the torque shaft 24, more specifically, between the fore end 128a of the reference tube 128 and the end section 24f of the torque shaft 24. A bearing 50 is located within a bearing housing 142 and rollingly supports the torque shaft 24 and has an inner race 51 defining oil passages 52 for lubrication of rollers 53 of the bearing 50. The fore end 128a of the reference tube 128 may be in abutment against the inner race 51 of the bearing 50 such that the drain outlet 130 communicates with the oil passages 52 of the inner race 51. This may allow to leverage the excess oil for lubricating the bearing 50. The excess oil that does not reach the pool 24d may flow out of the annular gap G via the annular space 130 along the arrows A1 shown in FIG. 5.

As for the configuration described with reference to FIG. 4, in some embodiments, a secondary drain outlet 30' is provided on an opposite sides of the tube aperture 28c such that the drain and secondary drain outlets 30, 30' are axially respectively fore and aft of the tube aperture 28c. In other words, the secondary drain outlets 30' may be located upstream of the tube aperture 28c relative to the oil flow flowing towards the splines 24b of the torque shaft 24.

The disclosed configurations having the drain outlet 30, 130 may minimize the probability of generating oil swirling/interference between the reference tube 28 and the torque shaft 24; may control the accumulation inside the reference tube 28; may prevent oil to reach specific surface/components (e.g. sensor 32, hot surfaces, seals); and may recycle the un-used oil for lubrication of other components such as sleeve, journal, bearing, splines. The oil drains can be used on one or both side of the tube apertures 28c.

Figure 6:
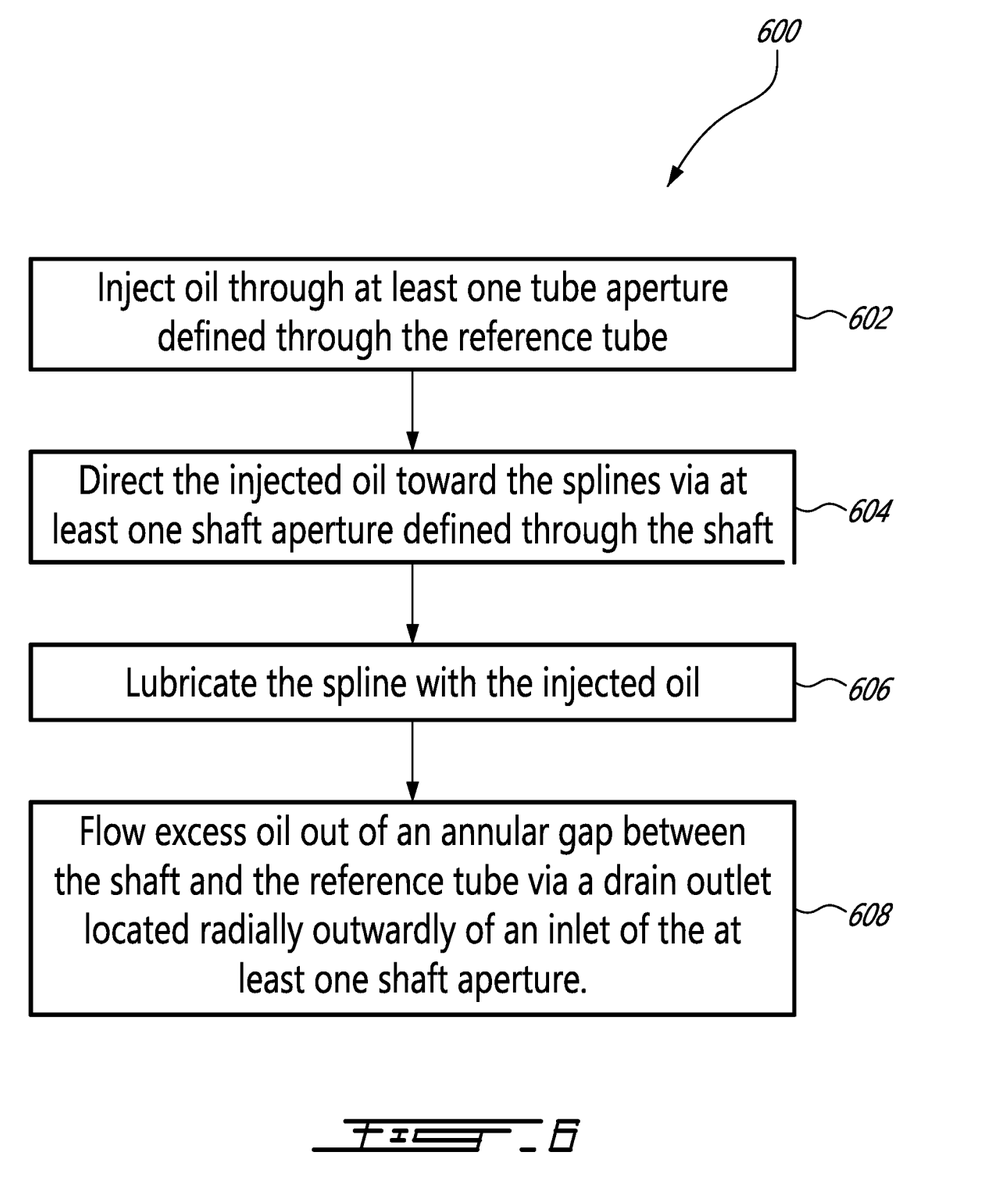
FIG. 6 is a flowchart illustrating steps of a method of lubricating splines of the torque shaft.

Referring now to FIG. 6, a method of lubricating the splines 24b is shown at 600. The method includes injecting the oil through the at least one tube aperture 28c defined through the reference tube 28 at 602; directing the injected oil toward the splines 24b via the at least one shaft aperture 24c defined through the torque shaft 24 at 604; lubricating the splines 24b with the injected oil at 606; and flowing the excess oil out of the annular gap G between the torque shaft 24 and the reference tube 28 via the drain outlet 30, 130, 30' located radially outwardly of an inlet of the at least one shaft aperture 24c at 608.

In the embodiment shown, the flowing of the excess oil via the drain outlet 30 at 608 includes flowing the excess oil via the drain outlet 30, 130 located downstream of the at least one tube aperture 28c relative to a flow of the injected oil. The directing of the injected oil toward the splines 24b at 604 may include flowing the oil in the pool 24d circumferentially extending around the central axis 11 and flowing the oil from the pool 24d through the at least one shaft aperture 24c; the drain outlet 30 being axially aligned with the pool 24d and located radially outwardly of the pool 24d.

The flowing of the excess oil may include flowing the excess oil through the drain outlet 30 defined through the reference tube 28. The flowing of the excess oil through the drain outlet 30 includes flowing the excess oil through the reference tube 28 in a direction having a radial component relative to the central axis 11. As shown in FIG. 4, the flowing of the excess oil includes flowing the excess oil through the drain outlet 30, 130 communicating with the bearing cavity 41.

As shown in FIG. 5, the flowing of the excess oil includes flowing the excess oil through the drain outlet 130 corresponding to the annular space defined radially between an end 128a of the reference tube 128 and the torque shaft 24. The excess oil may be flown out of the annular gap G and in the oil passages 52 defined by the inner race 51 of the bearing 50 in abutment against the end 128a of the reference tube 128. The flowing of the excess oil at 608 may include flowing the excess oil through the drain outlet 30 and in the bearing cavity 41. In some embodiments, excess oil is further flown out of the annular gap via the secondary drain outlet 30' located axially aft of the at least one tube aperture 28c.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
    a shaft rotatable about a central axis and engaged at an end thereof to a rotatable load via splines;
    a reference tube circumferentially extending around the shaft, the reference tube having a first end secured to the shaft for rotation with the shaft and a second end free relative to the shaft for measuring a deformation of the shaft, the reference tube defining at least one tube aperture through the reference tube;
    an oil nozzle fluidly connected to a source of oil, the oil nozzle defining an exit flow axis intersecting the at least one tube aperture for injecting oil through the reference tube, the shaft defining at least one shaft aperture extending through the shaft, an oil flow path extending from the oil nozzle to the splines via the at least one tube aperture and via the at least one shaft aperture for lubricating the splines; and
    a drain outlet located radially outwardly of an inlet of the at least one shaft aperture for outputting excess oil out of an annular gap defined between the shaft and the reference tube.

2. The aircraft engine of claim 1, wherein the drain outlet is located downstream of the at least one tube aperture relative to an oil flow from the oil nozzle.

3. The aircraft engine of claim 1, wherein the shaft defines a pool circumferentially extending around the central axis for receiving oil from the oil nozzle, the at least one shaft aperture in fluid flow communication with the pool, the drain outlet axially aligned with the pool and located radially outwardly of the pool.

4. The aircraft engine of claim 3, wherein the shaft has a main section and an end section, the end section defining the splines, a diameter of the main section less than that of the end section, the pool located proximate an intersection between the main section and the end section.

5. The aircraft engine of claim 1, wherein the drain outlet is defined through the reference tube.

6. The aircraft engine of claim 5, wherein the drain outlet extends in a direction having a radial component relative to the central axis.

7. The aircraft engine of claim 5, comprising a sensor for measuring a rotation of the shaft in relationship to the reference tube, the drain outlet being axially offset from the sensor.

8. The aircraft engine of claim 1, wherein the drain outlet is an annular space defined radially between an end of the reference tube and the shaft.

9. The aircraft engine of claim 8, comprising a bearing in abutment against with the end of the reference tube, the bearing having an inner race secured for rotation with the shaft, the inner race defining oil passages in fluid communication with the annular space.

10. The aircraft engine of claim 1, comprising a bearing rollingly engaged to the reference tube and a bearing housing circumferentially extending around the central axis and defining a bearing cavity containing the bearing, the drain outlet communicating with the bearing cavity.

11. A method of lubricating a splines of a shaft of an aircraft engine, the shaft surrounded by a reference tube having a first end secured to the shaft and a second end free relative to the shaft, the method comprising:
 injecting oil through at least one tube aperture defined through the reference tube;
 directing the injected oil toward the splines via at least one shaft aperture defined through the shaft;
 lubricating the splines with the injected oil; and
 flowing excess oil out of an annular gap between the shaft and the reference tube via a drain outlet located radially outwardly of an inlet of the at least one shaft aperture.

12. The method of claim 11, wherein the flowing of the excess oil via the drain outlet includes flowing the excess via the drain outlet located downstream of the at least one tube aperture relative to a flow of the injected oil.

13. The method of claim 11, wherein the directing of the injected oil toward the splines includes flowing the oil in a pool circumferentially extending around a central axis and flowing the oil from the pool through the at least one shaft aperture, the drain outlet being axially aligned with the pool and located radially outwardly of the pool.

14. The method of claim 11, wherein the flowing of the excess oil includes flowing the excess oil through the drain outlet defined through the reference tube.

15. The method of claim 14, wherein the flowing of the excess oil through the drain outlet includes flowing the excess oil through the reference tube in a direction having a radial component relative to the central axis.

16. The method of claim 11, wherein the flowing of the excess oil includes flowing the excess oil through the drain outlet communicating with a bearing cavity.

17. The method of claim 11, wherein flowing of the excess oil includes flowing the excess oil through the drain outlet being an annular space defined radially between an end of the reference tube and the shaft.

18. The method of claim 17, comprising flowing the excess oil out of the annular gap and in oil passages defined by an inner race of a bearing in abutment against an end of the reference tube.

19. The method of claim 11, wherein the flowing of the excess oil through the drain outlet includes flowing the excess oil in a bearing cavity defined by a bearing housing.

20. The method of claim 11, comprising flowing the excess oil via a secondary drain outlet located axially aft of the at least one tube aperture.

* * * * *